Nov. 23, 1926.
A. L. FREEDLANDER
RUBBER ROLL
Filed Dec. 29, 1922   2 Sheets-Sheet 1
1,608,206
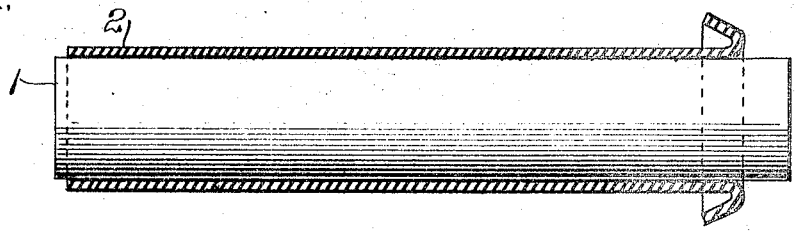
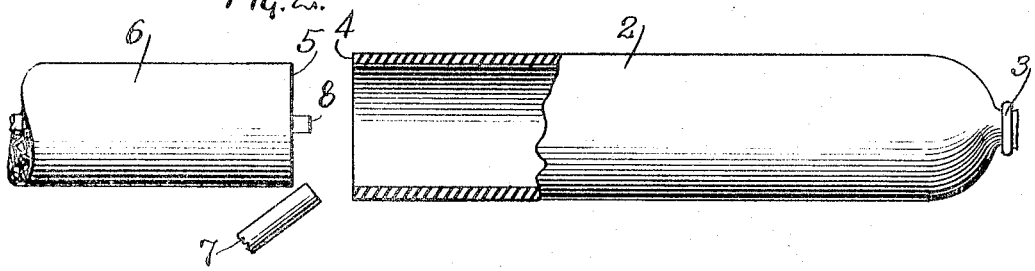
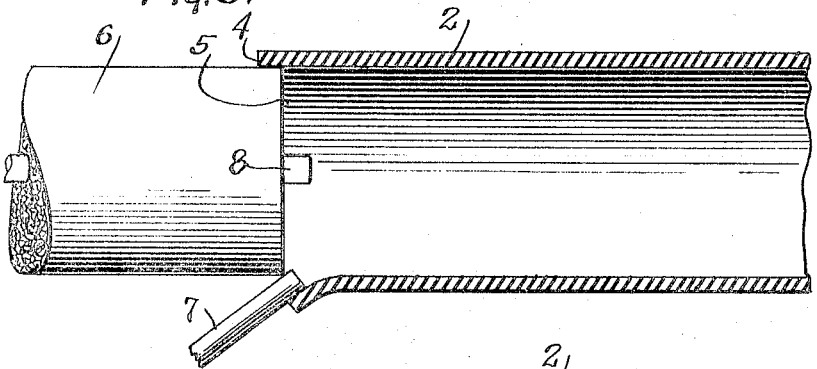
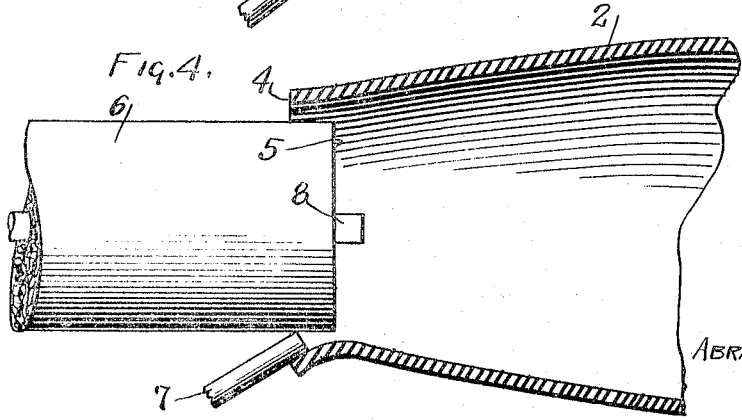
Inventor,
ABRAHAM L. FREEDLANDER,
By Toulmin & Toulmin
Attorneys Patented Nov. 23, 1926.

1,608,206

UNITED STATES PATENT OFFICE.

ABRAHAM L. FREEDLANDER, OF DAYTON, OHIO, ASSIGNOR TO THE DAYTON RUBBER MANUFACTURING COMPANY, OF DAYTON, OHIO, A CORPORATION OF OHIO.

RUBBER ROLL.

Application filed December 29, 1922. Serial No. 609,602.

My invention relates to rubber rolls and in particular rolls for printing and similar purposes.

It is the object of my invention to provide a rubber roll which will have the resilient characteristics necessary for the perfect engagement of the roll with the surface with which it comes in contact, while at the same time having a relatively smooth, hard surface which will be relatively impervious to ink and will not be readily effected by ink.

It is my object therefore to have a yielding member which will follow the irregularities and contours with the surface with which it is in contact while it will have a smooth surface of the desired character.

It is also an object of my invention to provide a roll which will not be effected by changes of temperature and humidity which has been the great difficulty experienced with gelatin rolls.

The difficulty with rolls of rubber previously experienced has been that if they were made sufficiently soft to have the necessary yielding characteristics the rubber would then be so absorbent and porous that it would not be a satisfactory rubber roll, would readily absorb the ink, and would be otherwise an unsatisfactory medium.

My roll solves the problem of having a yielding support for a smooth relatively hard impervious surface which is not effected by the conditions of temperature, humidity, chemicals in the ink, and does not absorb the ink. It also has the characteristic of spreading perfectly the materials coming in contact with it giving a fine even hard surface.

Referring to the drawings:

Figure 1 shows in section a steel roll or support upon which the relatively hard exterior covering is formed;

Fig. 2 shows this relatively hard covering having been removed from its support ready to be mounted upon the relatively soft core;

Fig. 3 illustrates this covering partially mounted upon the soft rubber core;

Fig. 4 is an enlarged view of the arrangement for mounting the shell on the core;

Figure 5:
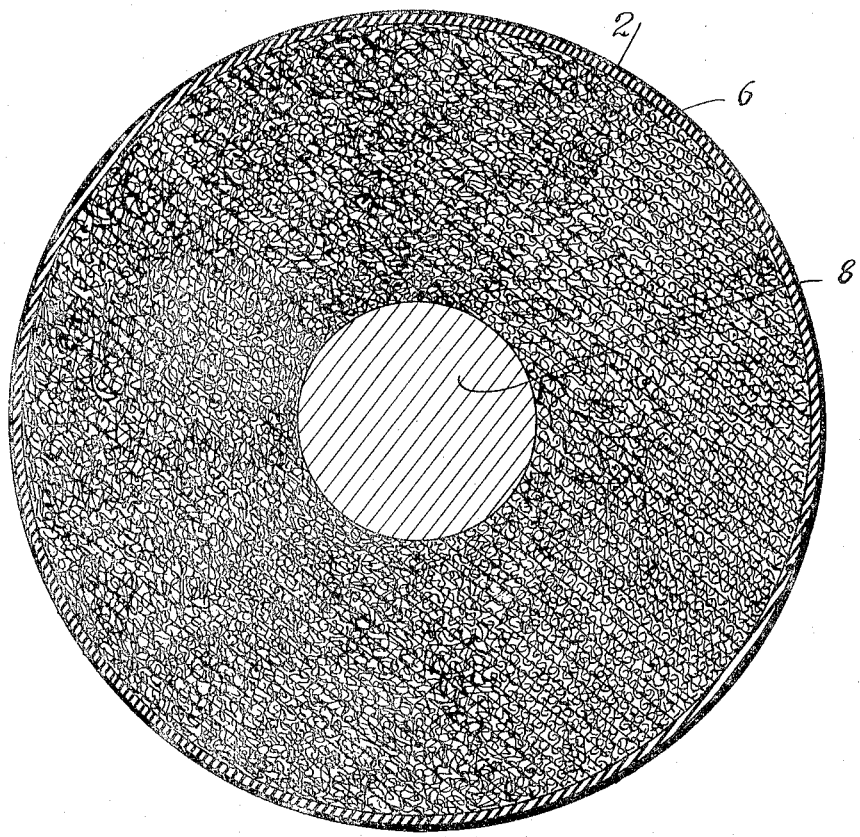
Fig. 5 is a section of the completed roll.

In practice I form the soft rubber core about a metal spindle or shaft so arranged to slip this soft core upon such a metal shaft. Such a core is usually about 6" in diameter while the metal shaft is about 1¾" in diameter.

This soft rubber roll may be composed of shoddy, rubber, an inorganic accelerator, vulcanizing material and an inorganic filler. In practice I have found that a said roll may be composed of approximately 30% soft rubber tire reclaimed shoddy, 40% rubber, 24% white lead, 5% sulphur and 1% dehydrated lime.

The hard rubber casing to be placed on the soft rubber roll may be composed of rubber, pigment, vulcanizing material, an organic accelerator and a softener. In the present instance I have found that a compound composed of 75% rubber, 19% zinc oxide, 3% sulphur, 1% hexamethylinetetramine and 2% candelilla wax is satisfactory.

This compound is placed upon a sherardized roll or mandrel which is highly polished. This rubber tubular member is vulcanized on this mandrel.

Referring to the drawings, the mandrel is designated 1 while this tubular rubber member, which is to form the relatively hard casing on the roll, is designated 2 and is shown in Figure 1 as being just removed from the mandrel.

This removal is carried out by grasping the end of the rubber tubular member 2 and peeling it off of the mandrel in the manner indicated in the drawing so that the surface which was adjacent to the hard steel surface of the mandrel will become the exterior surface of the roll. The contact with the smooth mandrel results in a very fine, smooth, hard surface on the outside of the resulting roll.

When this tubular rubber member 2 has been removed from the mandrel and thus turned inside-out, one end of it as at 3 is clamped together while the other end as at 4 is brought adjacent to the end 5 of the soft rubber roll 6. Between the end 4 and the end 5 of the tubular member and the roll there is introduced an air hose 7 which serves to inflate the tubular member 2 to such an extent that it will slip easily over the end of the soft rubber roll 6. By thus moving the tubular member 2 over 6 and by finally bringing the roll within the tube and removing the clamp at 3 the soft rubber roll will have the relatively dense and hard rubber casing mounted on it, thus securing the completed roll. The metal support or axle is designated 8.

By this relatively simple means I am enabled to mount the closely fitting relatively hard casing upon the soft rubber core.

It will be understood that I do not desire to confine myself to the specific ingredients or the specific proportions mentioned herein but desire to comprehend within my invention such modifications in compounds, proportions and mechanical arrangement which may be apparent to those skilled in the art engaged in utilizing my invention.

It will also be understood that by reason of my invention I am enabled to use the same relatively soft core by removing the shells and substituting other shells. This removal is by the same process which is employed to mount the shells on the core. This is particularly advantageous in view of the fact that it is often desired to substitute one shell using one color of ink for another shell using another color of ink.

By this method of mounting a shell with a glass-like surface I am enabled to eliminate all grinding which has been heretofore employed in preparing rubber rolls and which resulted in tearing and abrading the rubber and leaving a relatively rough surface.

Having thus fully described my invention, what I claim as new and desire to secure by Letters Patent, is:—

1. In a new article of manufacture such as a printing roll, a relatively soft interior portion composed of shoddy, rubber, an inorganic accelerator, vulcanizing material, and an inorganic filler, and a relatively hard casing composed of rubber, pigment, vulcanizing material, an organic accelerator and a softener.

2. In a new article of manufacture, such as a printing roll, a relatively soft rubber core and a relatively hard casing for said core composed of rubber, zinc oxide, sulphur, hexamethylinetetramine and candelilla wax.

3. In a new article of manufacture such as a printing roll, a relatively soft rubber core composed of rubber, white lead, and sulphur, with an exterior coating composed of rubber, zinc oxide, sulphur, hexamethylinetetramine, and candelilla wax.

4. In a new article of manufacture, a printing roll consisting of a soft rubber core being composed of approximately 30% reclaimed rubber shoddy, 40% rubber, 24% white lead, 5% sulphur, and 1% lime, and a relatively hard smooth covering thereon composed of approximately 75% rubber, 19% zinc oxide, 3% sulphur, 1% hexamethylinetetramine, and 2% candelilla wax.

5. In a new article of manufacture such as a printing roll, a relatively soft core principally of rubber and a shell detachably mounted thereon also composed largely of rubber with its outer surface treated to render it smooth and glass-like and also impervious to ink.

In testimony whereof, I affix my signature.

ABRAHAM L. FREEDLANDER.